United States Patent
Ichimaru

(10) Patent No.: US 8,554,359 B2
(45) Date of Patent: Oct. 8, 2013

(54) TRANSFER APPARATUS

(75) Inventor: Yuji Ichimaru, Fukuoka (JP)

(73) Assignee: Kabushiki Kaisha Yaskawa Denki, Kitakyushu-shi (JP)

(*) Notice: Subject to any disclaimer, the term of this patent is extended or adjusted under 35 U.S.C. 154(b) by 218 days.

(21) Appl. No.: 13/048,907

(22) Filed: Mar. 16, 2011

(65) Prior Publication Data
US 2011/0301744 A1 Dec. 8, 2011

(30) Foreign Application Priority Data
Jun. 3, 2010 (JP) .................................. 2010-127994

(51) Int. Cl.
*B25J 9/12* (2006.01)

(52) U.S. Cl.
USPC ........................................ 700/214; 700/215

(58) Field of Classification Search
USPC .................... 700/215, 216, 259, 245
See application file for complete search history.

(56) References Cited

U.S. PATENT DOCUMENTS

| | | | | |
|---|---|---|---|---|
| 5,446,835 A | * | 8/1995 | Iida et al. ...................... | 700/259 |
| 6,708,081 B2 | | 3/2004 | Yoshida | |
| 6,905,030 B2 | * | 6/2005 | Ratesic ...................... | 209/645 |
| 7,123,992 B2 | * | 10/2006 | Ban et al. ...................... | 700/258 |
| 7,203,573 B2 | * | 4/2007 | Ban et al. ...................... | 700/258 |
| 7,386,367 B2 | * | 6/2008 | Watanabe et al. ............. | 700/259 |
| 7,477,939 B2 | * | 1/2009 | Sun et al. ........................ | 604/20 |
| 7,957,580 B2 | * | 6/2011 | Ban et al. ...................... | 382/153 |
| 7,996,114 B2 | * | 8/2011 | Ban et al. ...................... | 700/259 |
| 8,240,461 B2 | * | 8/2012 | Asano et al. ............... | 198/502.1 |
| 2004/0086364 A1 | | 5/2004 | Watanabe et al. | |
| 2004/0117066 A1 | | 6/2004 | Ban et al. | |
| 2004/0122552 A1 | * | 6/2004 | Ban et al. ...................... | 700/214 |
| 2007/0177790 A1 | * | 8/2007 | Ban et al. ...................... | 382/153 |
| 2010/0249991 A1 | * | 9/2010 | Asano et al. .................. | 700/218 |

FOREIGN PATENT DOCUMENTS

| | | |
|---|---|---|
| EP | 1413404 | 4/2004 |
| EP | 1418025 | 5/2004 |
| JP | 01-134573 | 5/1989 |
| JP | 2002-036158 | 2/2002 |
| JP | 2003-211381 | 7/2003 |
| JP | 2004-188562 | 7/2004 |
| JP | 3805302 B2 | 7/2004 |

OTHER PUBLICATIONS

Japanese Office Action for corresponding JP Application No. 2010-127994, Jul. 31, 2012.
Extended European Search Report for corresponding EP Application No. 11157117.0-1239, Dec. 13, 2012.

* cited by examiner

*Primary Examiner* — Ramya Burgess
*Assistant Examiner* — Thomas Randazzo
(74) *Attorney, Agent, or Firm* — Ditthavong Mori & Steiner, P.C.

(57) ABSTRACT

A transfer apparatus includes a container that contains workpieces to be transferred, a sensor that detects a position and a posture of the workpiece existing in a predetermined detection area, and a robot that takes out the workpiece and transfers the workpiece to a transfer destination on the basis of a detection result of the sensor. The sensor includes an area storage that stores a plurality of detection areas, a condition storage that stores a switching condition for switching the detection areas, and a controller that switches the detection areas in a predetermined order when the switching condition is satisfied.

8 Claims, 8 Drawing Sheets

FIG. 5A
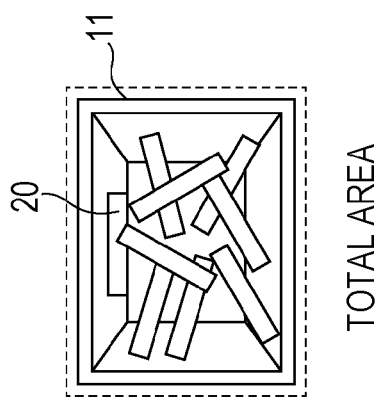
TOTAL AREA
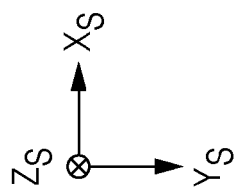
FIG. 5B
THIRD DETECTION AREA
SECOND DETECTION AREA
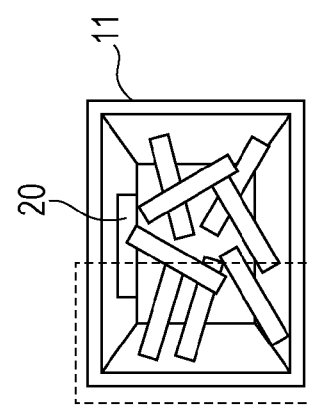
FIRST DETECTION AREA

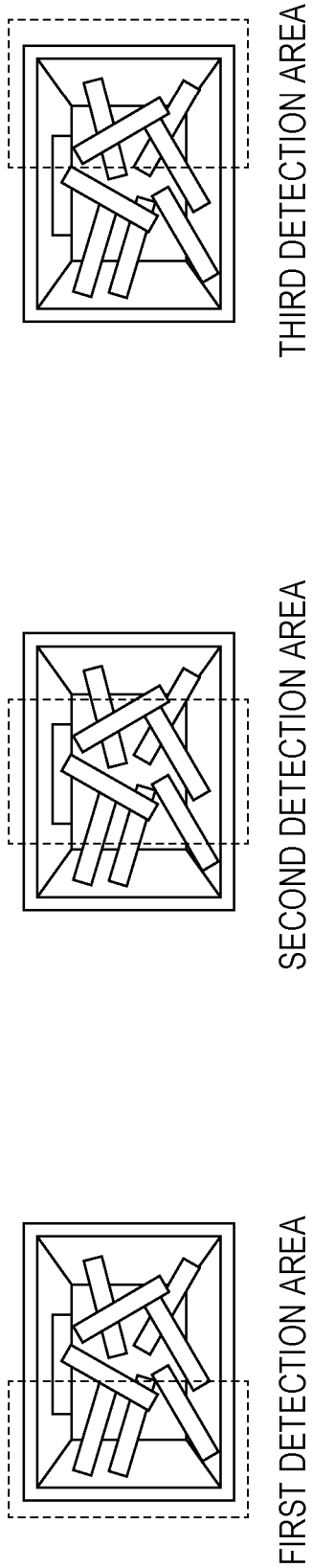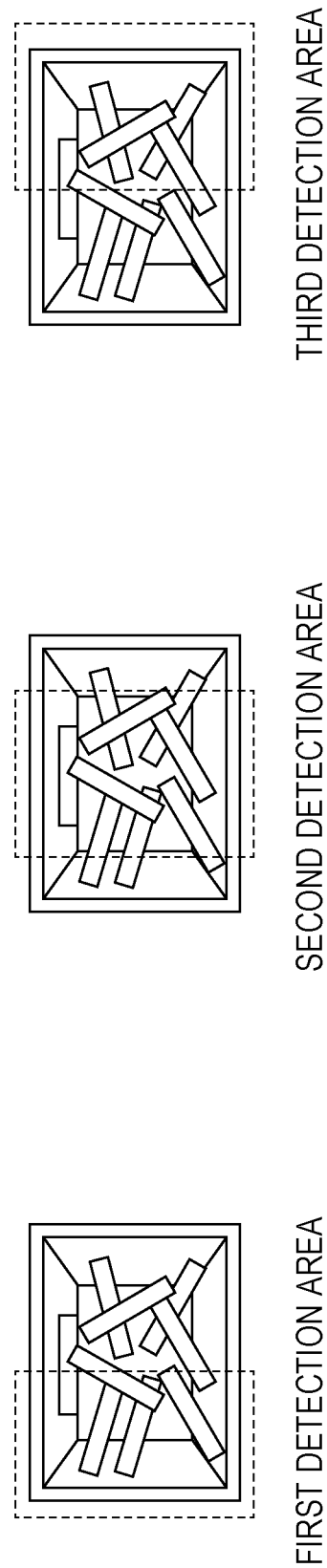

TRANSFER APPARATUS

CROSS-REFERENCE TO RELATED APPLICATION

The present application claims priority under 35 U.S.C. §119 to Japanese Patent Application No. 2010-127994, filed Jun. 3, 2010. The contents of this application are incorporated herein by reference in their entirety.

BACKGROUND OF THE INVENTION

1. Field of the Invention

The present invention relates to a transfer apparatus.

2. Description of the Related Art

Japanese Patent Laid-Open Publication No. 2004-188562 discloses a workpiece taking-out apparatus in which the position and posture of a workpiece are measured with a three-dimensional visual sensor mounted in a robot and the workpiece is taken out by the robot.

SUMMARY OF THE INVENTION

A transfer apparatus according to one aspect of the present invention includes a container that contains workpieces to be transferred; a sensor that detects a position and a posture of the workpiece existing in a predetermined detection area; and a robot that takes out the workpiece from the container and transfers the workpiece to a transfer destination on the basis of a detection result of the sensor. The sensor includes an area storage that stores a plurality of the detection areas, a condition storage that stores a switching condition for switching the plurality of the detection areas, and a controller that switches the plurality of the detection areas in a predetermined order when the switching condition is satisfied.

BRIEF DESCRIPTION OF THE DRAWINGS

The present invention will be described in further detail with reference to the accompanying drawings wherein:

FIGS. 5A and 5B are an explanatory view illustrating a total area to be scanned by the sensor in the transfer apparatus and an explanatory view illustrating switching among detection areas, respectively;

FIGS. 6A and 6B are explanatory views illustrating first to second detection areas to be scanned in a transfer apparatus according to a second embodiment of the present invention;

DETAILED DESCRIPTION OF THE EMBODIMENTS

Embodiments of the present invention will be described with reference to the attached drawings in order to provide a thorough understanding of the invention.

First Embodiment

Figure 1:
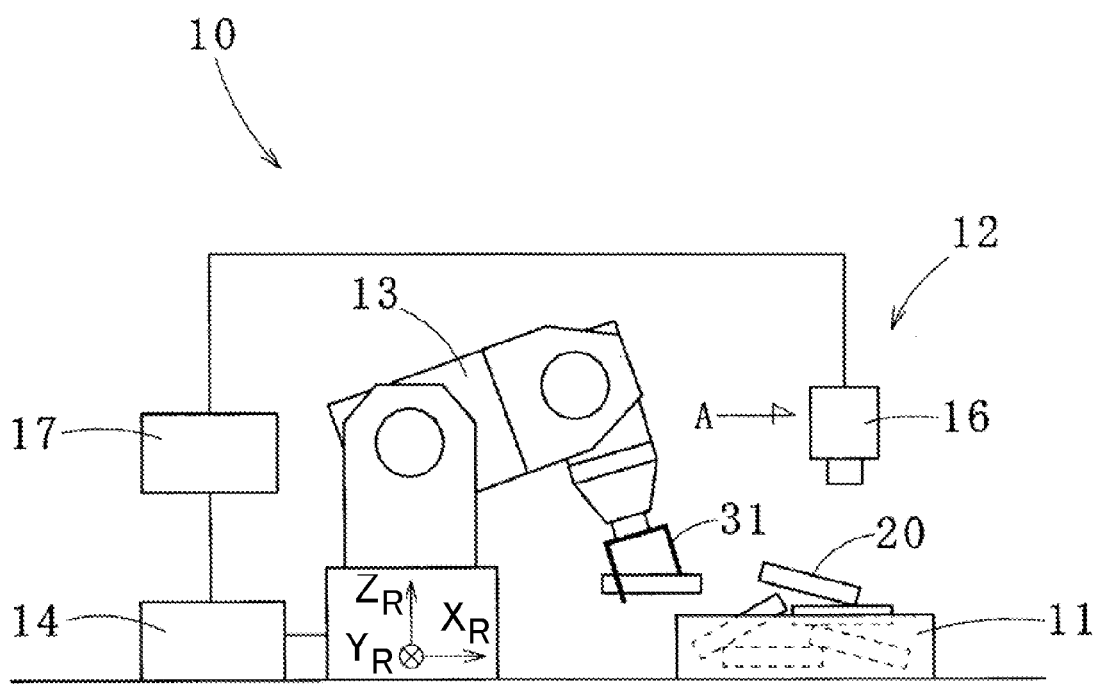
FIG. 1 is a structural view of a transfer apparatus according to a first embodiment of the present invention.

As illustrated in FIG. 1, a transfer apparatus 10 according to a first embodiment of the present invention includes a container 11, a three-dimensional shape measurement sensor (an example of a sensor) 12, a robot 13, and a robot control device 14. In FIG. 1, the coordinates formed by the XR-axis, the YR-axis, and the ZR-axis are orthogonal coordinates (robot coordinates) fixed for the robot 13.

The container 11 contains workpieces 20 to be transferred, and is shaped like a box with an upper surface opened. Alternatively, the container 11 may be formed by a tray. The workpieces 20 are arbitrary articles such as bolts or automobile components.

Figure 2A:
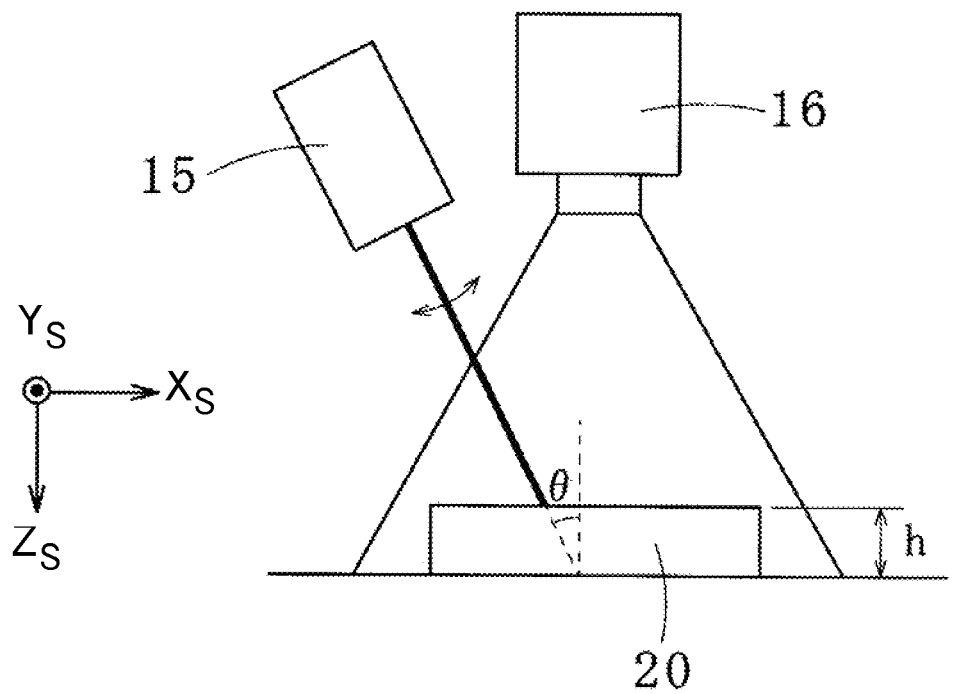
FIGS. 2A and 2B are a side view and a plan view, respectively, illustrating the operation principle of a sensor provided in the transfer apparatus.
Figure 2B:
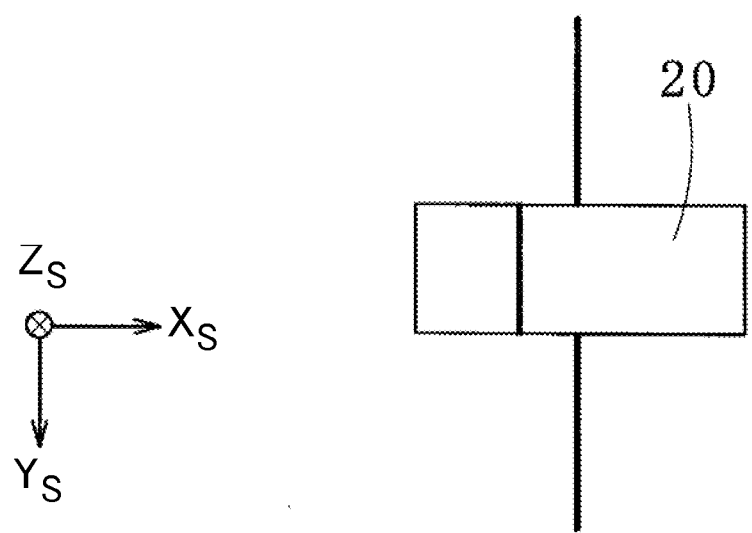

The three-dimensional shape measurement sensor 12 detects the positions and postures of workpieces 20 existing in a predetermined detection area. The three-dimensional shape measurement sensor 12 includes a projector 15 that emits laser light (see FIG. 2A), a camera 16 that takes images of all workpieces 20 irradiated with the laser light, and a measurement control device 17 that calculates the positions and postures of the workpieces 20 while controlling the projector 15 and the camera 16 (see FIG. 1). FIG. 2A is a view on arrow A of FIG. 1. In FIGS. 2A and 2B, the coordinates formed by the XS-axis, the YS-axis, and the ZS-axis are orthogonal coordinates (sensor coordinates) fixed for the camera 16.

As illustrated in FIG. 2A, the projector 15 applies laser light (line pattern light) onto a workpiece 20 at an irradiation angle $\theta$ to the ZS-axis. The projector 15 incorporates a light source for the laser light (not illustrated), and a polygonal mirror for reflecting the laser light emitted from the light source toward the workpiece 20 (not illustrated). An unillustrated mirror driving means drives the polygonal mirror so that the projector 15 scans the entire workpiece 20 with the laser light in the X-direction.

As illustrated in FIG. 2B, the camera 16 takes an image of the workpiece 20 irradiated with the laser light from the projector 15 at an angle different from the irradiation angle $\theta$ of the laser light.

The measurement control device 17 (see FIG. 1) obtains the distribution of a height h of the workpiece 20 by triangulation on the basis of the taken image, and also obtains the shape of the workpiece 20 in an XY-plane. That is, the three-dimensional shape measurement sensor 12 measures a three-dimensional shape of the workpiece 20 by a so-called light cutting method. The measurement control device 17 may be incorporated in the robot control device 14.

Figure 3:
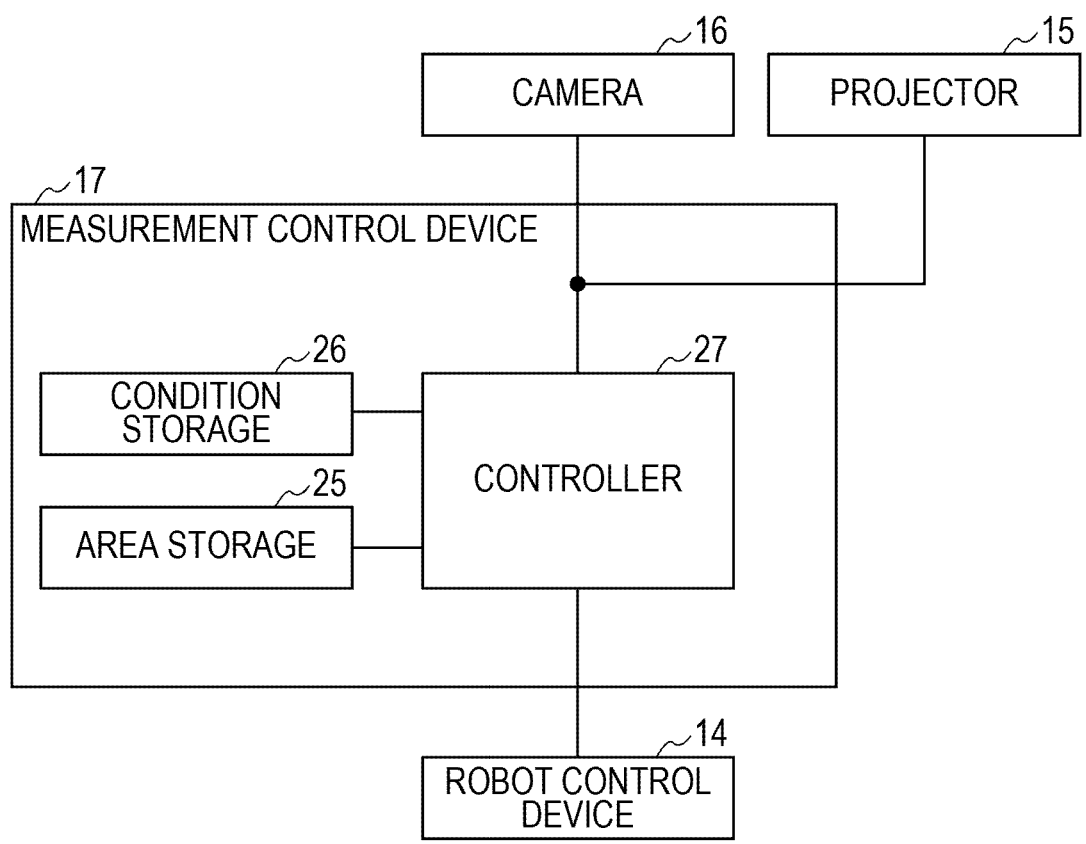
FIG. 3 is a functional block diagram of a measurement control device in the transfer apparatus.

As illustrated in FIG. 3, the measurement control device 17 includes an area storage 25, a condition storage 26, and a controller 27.

The area storage 25 stores the position and size of a detection area where the projector 15 scans the workpiece 20. A plurality of detection areas are set by the user beforehand. In the first embodiment, the area storage 25 stores three areas (first to third detection areas). Here, the total area (see FIG. 5A) in which the entire container 11 fits in plan view is divided into the first to third detection areas in the scanning direction of the laser light, as illustrated in FIG. 5B. The detection areas are not obtained by equally dividing the total area, but adjacent detection areas overlap at edges thereof. The area storage 25 is realized by a memory as an example.

The condition storage 26 stores a switching condition for switching among the detection areas stored in the area storage 25. The switching condition is set by the user beforehand. Under the switching condition of the first embodiment, the detection area is switched every time the robot 13 takes out a workpiece 20 from the container 11. The condition storage 26 is realized by a semiconductor memory as an example.

The controller 27 controls lighting of the light source in the projector 15 so as to scan the detection areas stored in the area storage 25. The controller 27 also controls the mirror driving means. Further, the controller 27 controls the camera 16, obtains a three-dimensional shape of a workpiece 20 existing in the detection area from an image taken by the camera 16, and calculates the position and posture of the workpiece 20. Here, the calculated position and posture of the workpiece 20 are data in the sensor coordinate system. The controller 27 converts the data on the position and posture in the sensor coordinate system into data in the robot coordinate system.

Further, the controller 27 transmits the position and posture of the workpiece 20 converted into the data in the robot coordinate system to the robot control device 14. For example, the controller 27 is realized by software to be implemented by a CPU (not illustrated) mounted in the measurement control device 17.

The robot control device 14 receives the data on the position and posture of the workpiece 20 from the controller 27, and controls the operation of the robot 13 on the basis of this data.

The robot 13 takes a workpiece 20 out from the container 11 with an end effector 31 (see FIG. 1) provided at a tip of an arm, and transfers the workpiece 20 to a predetermined transfer position (transfer destination). In the first embodiment, the robot 13 is an articulated robot. The robot 13 may be a gantry robot, a parallel link robot, or other working machines, instead of the articulated robot.

Figure 4:
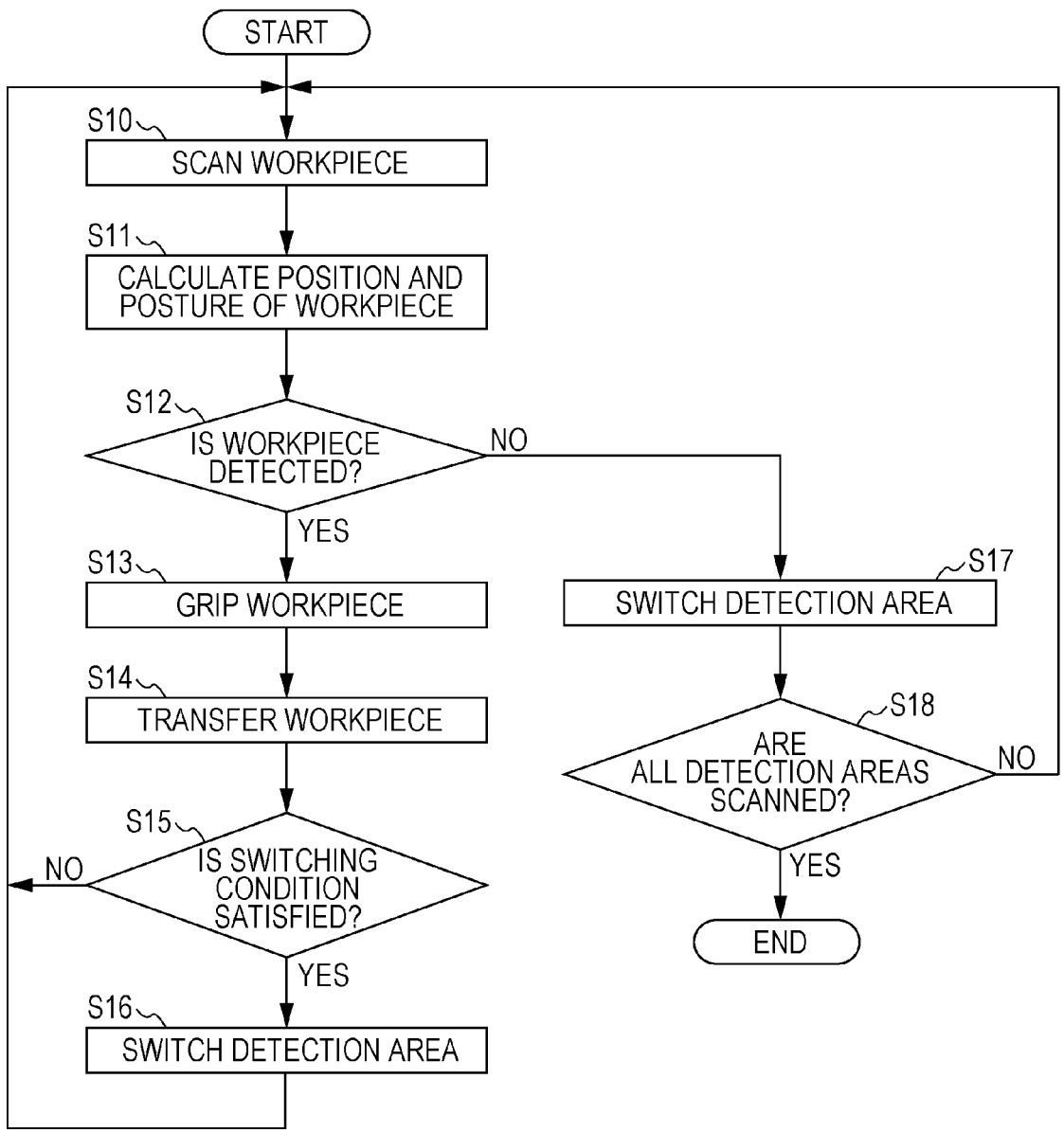
FIG. 4 is an operation flowchart of the transfer apparatus.

Next, the operation of the transfer apparatus 10 will be described with reference to FIGS. 4, 5A, and 5B.

Step S10

The first detection area (see FIG. 5B) stored in the area storage 25 is scanned with the laser light emitted from the projector 15, and the camera 16 takes an image of the first detection area. Although a long time of, for example, about 1.2 seconds is taken to scan the total area of FIG. 5A, the measurement control device 17 scans only a part of the total area in this step. Hence, the detection time for the workpiece 20 is made shorter than when the total area is scanned. Further, the total transfer time is shortened.

Step S11

The controller 27 of the measurement control device 17 obtains a shape of the workpiece 20 from the image taken by the camera 16. The controller 27 calculates a position and a posture of the workpiece 20 in the sensor coordinate system from the obtained shape of the workpiece 20. In this case, an image area corresponding to the first detection area may be obtained from the image taken by the camera 16, and the shape of the workpiece 20 may be obtained from image data on this image area. This reduces the amount of data to be processed, and shortens the time required for data processing.

Step S12

When the shape of the workpiece 20 is calculated in Step S11, it is determined that the workpiece 20 is detected, and the procedure proceeds to Step S13.

In contrast, when the position and posture of the workpiece 20 cannot be calculated in Step S11, it is determined that the workpiece 20 cannot be detected, and the procedure proceeds to Step S17. In Step S17, the detection area is switched to the next area, and the procedure proceeds to Step S18. In Step S18, when scanning of all detection areas is completed, all workpieces 20 have been taken out of the container 11, and therefore, the transfer apparatus 10 finishes the operation. In Step S18, if scanning of all detection areas is not completed, the procedure returns to Step S10, and the transfer apparatus 10 continues the operation.

Step S13

The controller 27 converts the position and posture in the sensor coordinate system into a position and a posture in the robot coordinate system. After that, the controller 27 transmits the position and posture in the robot coordinate system to the robot control device 14.

Next, the robot control device 14 controls the robot 13 on the basis of the data on the position of the workpiece 20 received from the measurement control device 17 so as to move the end effector 31 to the position of the workpiece 20 and to correct the grip posture of the end effector 31 on the basis of the data on the posture of the workpiece 20. After that, the robot 13 grips the workpiece 20.

Step S14

The robot 13 moves the gripped workpiece 20 to the predetermined transfer destination. This transfer destination is a place taught beforehand, for example, a belt conveyor.

Step S15

The controller 27 determines whether or not the switching condition is satisfied. When the switching condition is satisfied, the procedure proceeds to Step S16.

In contrast, when the switching condition is not satisfied, the detection area is not switched, and the procedure returns to Step S10.

Step S16

The controller 27 switches the detection area to the second detection area according to the switching condition. As described above, the switching condition is set such that the detection area is switched every time the robot 13 takes out one workpiece 20. Therefore, every time one workpiece 20 is transferred, the controller 27 sequentially and repeatedly switches the detection area among the first detection area, the second detection area, and the third detection area.

In this way, the transfer apparatus 10 repeats Steps S10 to S18 while switching the detection area until all workpieces 20 in the container 11 are transferred.

Second Embodiment

Next, a transfer apparatus according to a second embodiment of the present invention will be described. The same components as those adopted in the transfer apparatus 10 of the first embodiment are denoted by the same reference numerals, and detailed descriptions thereof are omitted.

The second embodiment is different from the first embodiment in detection areas stored in an area storage 25 of a measurement control device 17. More specifically, the ranges of the detection areas are increased according to the number of times a robot 13 transfers a workpiece 20. That is, the detection areas are not fixed, but are changed during operation of the transfer apparatus.

At the beginning of the transfer operation, scanning is performed while switching among first to third detection areas illustrated in FIG. 6A in order. As the number of times the robot 13 transfers the workpiece 20 increases, a three-dimensional shape measurement sensor 12 scans the workpiece 20 while increasing the ranges of the detection areas, as illustrated in FIG. 6B.

As the robot 13 continues to transfer the workpieces 20, the number of workpieces 20 in the container 11 decreases. For this reason, the possibility that no workpiece 20 can be detected by one scanning operation increases. When no workpiece 20 can be detected, a cycle time (takt time) is increased by the scanning time. By increasing the ranges of the detection areas as in the second embodiment, wasted scanning time is reduced, and the total transfer time of the workpieces 20 is shortened.

Third Embodiment

Next, a transfer apparatus 40 according to a third embodiment of the present invention will be described. The same components as those adopted in the transfer apparatuses of the first and second embodiments are denoted by the same reference numerals, and detailed descriptions thereof are omitted.

Figure 7:
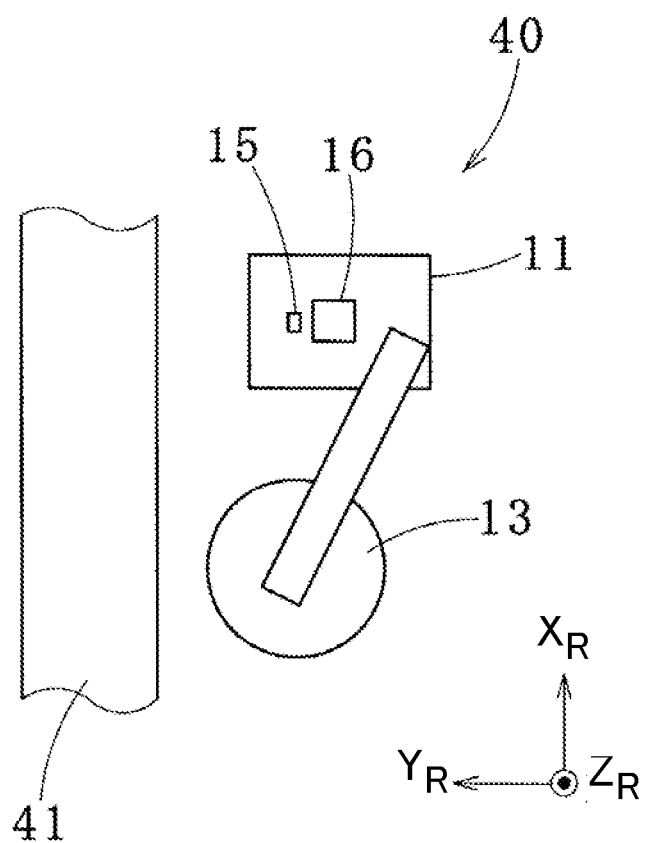
FIG. 7 is a structural view of a transfer apparatus according to a third embodiment of the present invention.

As illustrated in FIG. 7, the transfer apparatus 40 of the third embodiment transfers workpieces 20 contained in a container 11 to a conveyor (an example of a transfer destination) 41.

Figure 8:
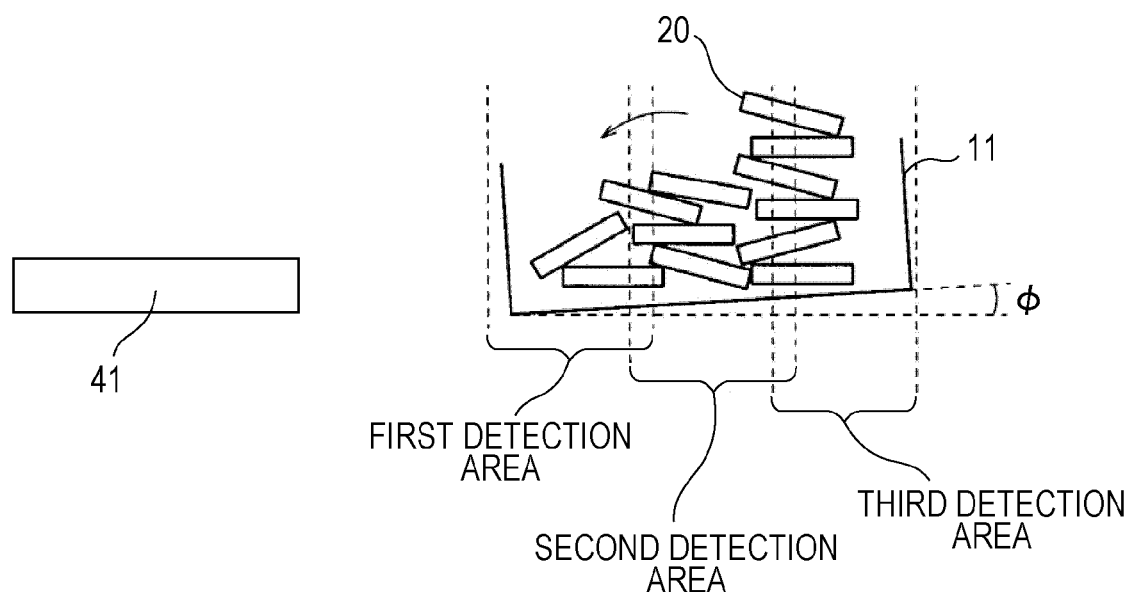
FIG. 8 illustrates a setting state of a container in the transfer apparatus.

As illustrated in FIG. 8, the container 11 is inclined at an angle φ to the horizontal plane so that the height of a side of the container 11 near the conveyor 41 is lower. Since the height of one side of the container 11 is lower in this way, the workpieces 20 stacked in the container 11 unpile in the direction of arrow in FIG. 8 (toward the lower side) by the action of gravity, and get together on the conveyor 41 side. Particularly when the robot 13 takes out a workpiece 20, the remaining workpieces 20 are more likely to get together on the conveyor 41 side because of the impact applied by the take-out operation.

An area storage 25 stores a first detection area, a second detection area, and a third detection area illustrated in FIG. 8. The first detection area is set on the conveyor 41 side (the lower side of the container 11).

The first detection area is closer to the conveyor 41 than the other detection areas. For this reason, when the robot 13 transfers a workpiece 20 from the first detection area to the conveyor 41, the transfer distance of the workpiece 20 is short, and this is advantageous from the viewpoint of the cycle time.

A controller 27 scans the first detection area more times than the other detection areas. For example, the controller 27 scans the first detection area consecutively twice, and then scans each of the second detection area and the third detection area once. These operations are repeated.

According to the third embodiment, more workpieces 20 can be taken out from the first detection area. This shortens the total transfer time.

Fourth Embodiment

Next, a transfer apparatus according to a fourth embodiment of the present invention will be described. The same components as those adopted in the transfer apparatuses of the first to third embodiments are denoted by the same reference numerals, and detailed descriptions thereof are omitted.

The transfer apparatus of the fourth embodiment is different from the first embodiment in a switching condition. More specifically, a switching condition is set such that a detection area is switched when the total weight of workpieces 20 in a container 11 falls below a predetermined weight.

Alternatively, the switching condition may be set such that the detection area is switched on the basis of the elapsed time from the start of operation of the transfer apparatus. Further alternatively, a certain detection area may be intensively and consecutively scanned, and, if no workpiece 20 is detected even by a predetermined consecutive number of scanning operations, the next detection area may be scanned. For example, when the first detection area is intensively and consecutively scanned and no workpiece 20 is detected even by three consecutive scanning operations, the second detection area is intensively and consecutively scanned, and subsequently, the third detection area is scanned similarly. Alternatively, the switching condition may be set such that the detection area is switched when the number of transfer operations of the workpieces 20 exceeds a predetermined number.

The present invention is not limited to the above-described embodiments, and modifications can be made without departing from the scope of the invention. For example, the technical field of the invention also includes a case in which some or all of the above embodiments and modifications are combined to carry out the invention.

In the above embodiments, the detection area is divided into the first to third detection areas. Alternatively, the detection area may be divided into two detection areas or four or more detection areas.

The measurement control device 17 subjects the data on the position and posture of the workpiece 20 to coordinate conversion. Alternatively, the measurement control device 17 may transmit the data on the position and posture of the workpiece 20 in the sensor coordinate system to the robot control device 14 without performing coordinate conversion, and the robot control device 14 may convert the received data into data in the robot coordinate system.

The three-dimensional shape measurement sensor 12 using the light cutting method may be replaced with a three-dimensional shape measurement sensor using a stereo method with a plurality of cameras. In this case, image areas corresponding to the detection area are obtained from images taken by the cameras, and the position and posture of the workpiece 20 are obtained from image data on the image areas. Since the amount of data to be processed is made smaller than when an image of the total area is taken, the time taken to calculate the position and posture of the workpiece 20 is shortened. This three-dimensional shape measurement sensor using the stereo method need not perform scanning with laser light, and can detect the workpiece 20 even under a bright condition where detection of the laser light is difficult.

Further, the three-dimensional shape measurement sensor using the light cutting method may be replaced with a three-dimensional shape measurement sensor using an infrared time-of-flight (TOF) method. Since this three-dimensional shape measurement sensor uses infrared light, it has little influence on the human body. Moreover, the three-dimensional shape measurement sensor can stably detect the workpiece 20 even if the illumination condition of the external environment changes.

When the number of workpieces 20 remaining in the container 11 decreases, detection cannot be performed in any detection area, and the time taken to scan the detection area is wasted. Accordingly, the controller 27 may count the number of times workpieces 20 are taken out, and the total area may be scanned after the counted number becomes larger than or equal to a predetermined number.

What is claimed is:
1. A transfer apparatus comprising:
a container to contain workpieces to be transferred;
a sensor configured to detect a position and a posture of a workpiece existing in a predetermined detection area set on the container; and
a robot configured to take out the workpieces from the container and to transfer the workpieces to a transfer destination on the basis of a detection result of the sensor,
wherein the sensor includes
an area storage configured to store a plurality of detection areas,
a condition storage configured to store a switching condition to switch the plurality of the detection areas, and a controller configured to switch the plurality of the detection areas in a predetermined order when the switching condition is satisfied, and wherein the plurality of the detection areas are enlarged according to a number of times the robot transfers the workpieces.

2. A transfer apparatus comprising:

a container to contain workpieces to be transferred;

a sensor configured to detect a position and a posture of a workpiece existing in a predetermined detection area set on the container; and a robot configured to take out the workpieces from the container and to transfer the workpieces to a transfer destination on the basis of a detection result of the sensor, wherein the sensor includes
- an area storage configured to store a plurality of detection areas,
- a condition storage configured to store a switching condition to switch the plurality of the detection areas, and
- a controller configured to switch the plurality of the detection areas in a predetermined order when the switching condition is satisfied, wherein the container is inclined such as to be lower on a side near the transfer destination, and wherein the sensor scans a detection area on a lower side of the container, of the plurality of the detection areas, more times than the other detection area.

3. The transfer apparatus according to claim 2, wherein the switching condition is that a number of transfer operations of the workpieces exceeds a predetermined number.

4. The transfer apparatus according to claim 2, wherein the switching condition is that a weight of the workpieces contained in the container falls below a predetermined weight.

5. The transfer apparatus according to claim 2, wherein the switching condition is that a predetermined time elapses.

6. The transfer apparatus according to claim 2, wherein the switching condition is that the sensor does not detect the position and the posture of the workpiece a predetermined consecutive number of times.

7. The transfer apparatus according to claim 3, wherein the sensor is a three-dimensional shape measurement sensor using a light cutting method.

8. A transfer apparatus comprising:

workpiece containing means for containing workpieces to be transferred;

detection means for detecting a position and a posture of a workpiece existing in a predetermined detection area set on the container; and transfer means for taking out the workpieces from the workpiece containing means and for transferring the workpieces to a transfer destination on the basis of a detection result of the detection means, wherein the detection means includes
- area storage means for storing a plurality of detection areas,
- condition storage means for storing a switching condition for switching the plurality of the detection areas, and
- controller means for switching the plurality of the detection areas in a predetermined order when the switching condition is satisfied, wherein the workpiece containing means is inclined such as to be lower on a side near the transfer destination, and wherein the detection means is for scanning a detection area on a lower side of the container, of the plurality of the detection areas, more times than the other detection area.

* * * * *